INVENTORS T. W. EDDY
G. E. HARRINGTON
BY G. E. Hirsch Jr.
ATTORNEY

United States Patent Office 3,421,114

Patented Jan. 7, 1969

3,421,114

ATTENUATOR APPARATUS EMPLOYING VARIABLE DUTY CYCLE MODULATION

Thomas W. Eddy, Whippany, and George E. Harrington, Chatham, N.J., assignors to Bell Telephone Laboratories, Incorporated, New York, N.Y., a corporation of New York Filed Oct. 22, 1965, Ser. No. 501,579

U.S. Cl. 332—9 9 Claims

Int. Cl. H03k 7/00

ABSTRACT OF THE DISCLOSURE

Selected attenution of an information carrying input signal is accomplished with low distortion by modulating the signal with a pulse train signal of variable duty ratio. A specifically predetermined sideband of the resulting modulated signal is isolated so that selected variations in the duty ratio result in the desired attenuation. The duty ratio may be controlled by the level of the input signal itself to create an automatic gain control circuit.

This invention pertains to signal amplitude control systems and, more particularly, to attenuation apparatus which turns to account the principles of pulse modulation.

Signal amplitude control apparatus in the form, for example, of an active or passive attenuator, finds wide use in the communications industry. In many applications, relatively simple passive devices, such as a network of resistors and capacitors, are entirely adequate. However, in other applications, serious limitations are inherent in the operation of such attenuators. For example, some attenuators of the prior art exhibit a tendency to discriminate against the low and high frequency components of the signal to be attenuated. Discrimination of this sort cannot be tolerated in more sophisticated systems. Unfortunately, in response to the need for broadband attenuators, resort has been made to complex devices which purchase frequency responsiveness at the expense of sensitivity, i.e., they fail to respond adequately to minute changes in applied control signals.

It is, therefore, an object of this invention to accomplish sensitive signal amplitude control in response to minute changes in an applied signal.

Another object is to incorporate the attenuation principles of this invention in an improved automatic gain control circuit.

These and other objects are accomplished, in acordance with the present invention, by the selective utilization of predetermined components of the modulation product of the signal to be controlled, and a periodic train of pulses of variable duty ratio. More particularly, an applied information bearing wave is modulated with a train of pulses of fixed repetition rate and variable pulse width. The spectrum of the resulting modulated signal includes the spectrum of the applied input signal and replicas thereof in the form of sidebands symmetrically disposed about the harmonics of the fundamental frequency of the pulse train. The amplitude of these sideband replicas is extremely sensitive to changes in the duty ratio of the modulating pulse train. In conformity with the present invention, that predetermined sideband replica is selected which exhibits a desired attenuation versus duty ratio characteristic. Attenuation is accomplished with ease and effectiveness by altering the duty ratio of the modulating pulse train.

These and further features and objects of this invention, its nature and various advantages will be more readily apparent upon consideration of the attached drawings and of the following detailed description of the drawings.

Figure 1:
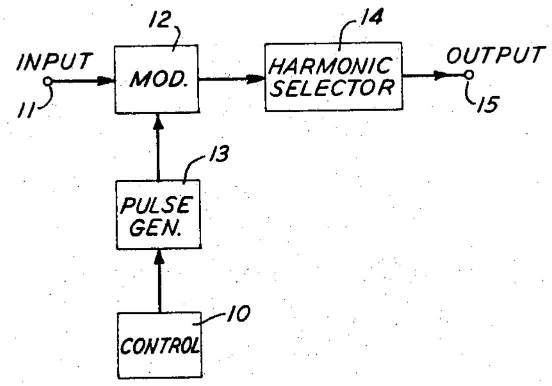
FIG. 1 is a block diagram of modulation apparatus, the operation of which is illustrative of the principles of the present invention.

The apparatus depicted in FIG. 1 is responsive to signals applied at input terminal 11. Modulator 12, which may be of any well-known type, develops the product of the applied message wave and the output signal of pulse generator 13. The output signal of generator 13 may consist of a periodic train of rectangular pulses of unit height, width $d$ and frequency $1/T$, where T is the repetition rate of the pulse train. Thus the duty ratio, sometimes referred to as the duty cycle, i.e., pulse width divided by the repetition rate, is $d/T$. As well known by those versed in the art of signal processing, the spectrum of the modulated signal appearing at the output of modulator 12 includes the spectrum of the applied input signal and replicas thereof in the form of sidebands symmetrically disposed about the harmonics of the reciprocal of the pulse repetition rate. Analytically, this spectral relationship is defined by the Fourier transform of the modulated signal, $F(\omega)$, which may be expressed as:

$$F(\omega)=\sum_{n-\infty}^{n=\infty}\frac{\sin\pi\left(\frac{nd}{T}\right)}{\pi n}M\left(\omega+\frac{2\pi n}{T}\right)$$

where $M(\omega)$ is the spectrum of the applied message wave.

The amplitude of the sideband replicas of the input wave located about the $n$th harmonic of the fundamental frequency of the pulse train, i.e., $n/T$, is therefore proportional to the factor, $$\frac{\sin\pi\left(\frac{nd}{T}\right)}{\pi n}$$

which itself is dependent on the duty ratio $d/T$ and the integer $n$. This relationship is depicted in FIG. 2.

Figure 2:
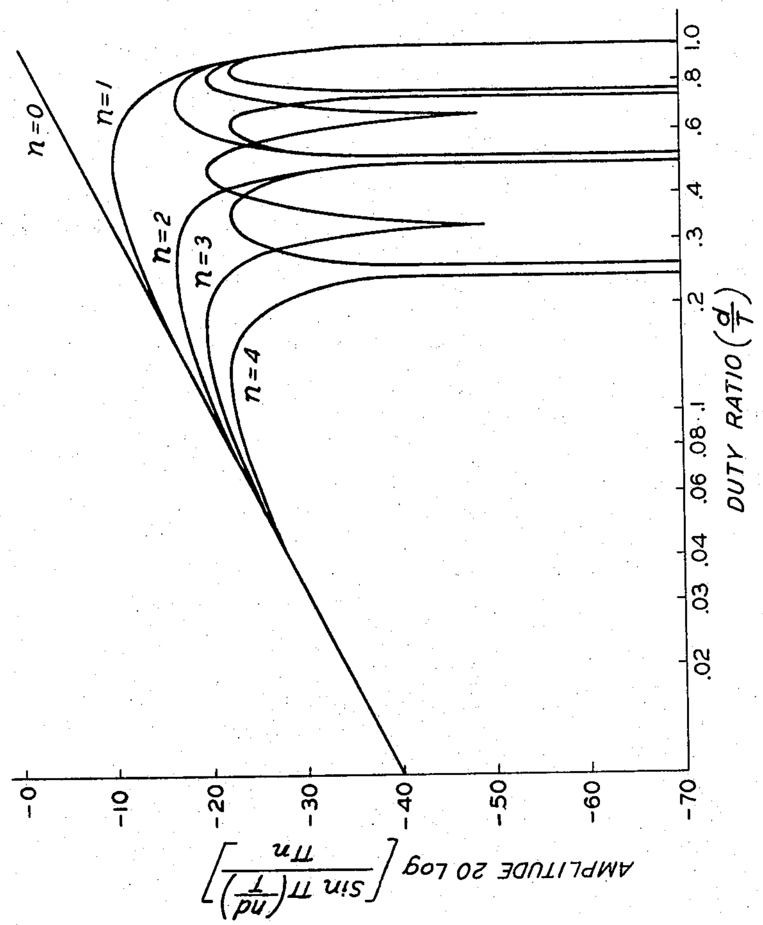
FIG. 2 is a graphical portrayal of the family of attenuation characteristics of the apparatus of this invention.

FIG. 2 is a plot of the amplitude factor, $$\frac{\sin\pi\left(\frac{nd}{T}\right)}{\pi n}$$

in decibels versus the duty ratio, $d/T$. Each locus of FIG. 2 represents the attenuation characteristic of a specific sideband replica of the input spectrum, that is, the different values of $n$ correspond to the respective harmonics of the fundamental frequency. As is readily apparent from an examination of FIG. 2, the amplitude of these sideband components is extremely sensitive to changes in the duty ratio of the pulse train, i.e., the change in amplitude for each incremental change in the duty ratio is of an appreciable magnitude. Thus, for $n=1$, corresponding to the sideband components symmetrically disposed about the first harmonic of the pulse train fundamental frequency, a change in duty ratio, $d/T$, from .7 to .98 results in an attenuation of 22 db. Similarly, for $n=2$, a change in $d/T$ from .35 to .49 results in an attenuation of 22 db.

Thus, by selectively choosing a desired replica of the input spectrum, an attenuator may be realized which exhibits an extreme sensitivity to changes in the duty ratio of the modulating pulse train.

In the apparatus depicted in FIG. 1, a predetermined harmonic replica is chosen by harmonic selector 14. Selector 14 may be a bandpass filter which selectively transmits only those sideband components located at a predetermined integral multiple of the fundamental frequency of the pulse train. More generally, harmonic selector 14 may be a bank of filters each exhibiting a bandpass characteristic located about various harmonics of the fundamental frequency. By employing any well-known switching apparatus, different sidebands may be selectively chosen for transmission, effectively changing the attenuation characteristic, when so desired. In order to obtain the attenuated signal at baseband frequency, it is a simple matter to demodulate the signal using conventional modulating apparatus. If so desired, the demodulating function may be a second train of pulses of variable duty ratio to effect an additional step of attenuation. Alteration of the duty ratio of the pulse train may be effected by mechanical means or in response to signals emanating from control apparatus, illustratively shown as device 10 of FIG. 1. The desired output signal is developed at output terminal 15.

Figure 3:
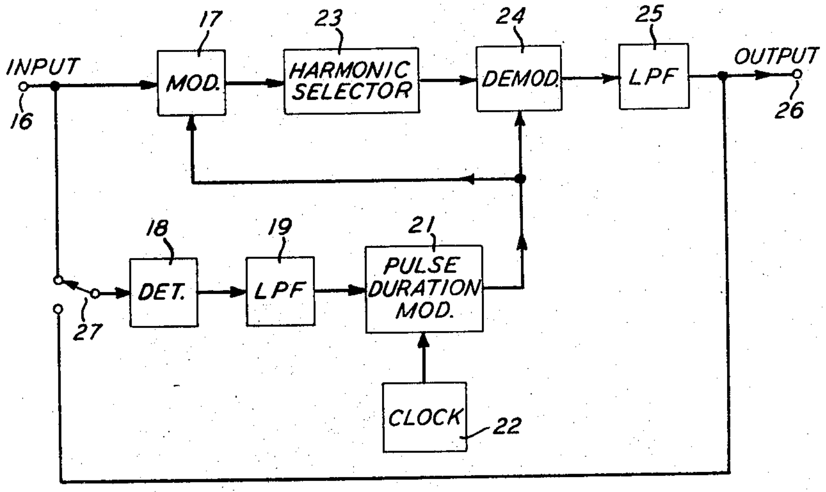
FIG. 3 is a block diagram of an automatic gain control (AGC) circuit which operates in accordance with the principles of this invention.

The principles of the present invention find use wherever selective attenuation must be achieved. One illustrative application of the principles of this invention is in the forward acting AGC circuit of FIG. 3. As is well known, AGC circuits are utilized, typically in a communications receiver, to maintain the output signal level of the receiver substantially constant despite variations in the level of the input signal. In FIG. 3, a signal applied to input terminal 16 is conveyed via switch 27 to detector 18, e.g., a square law rectifier, which develops a signal proportional to the amplitude of the applied signal. Low pass filter 19 removes any undesired and extraneous components of the detected signal. The filtered signal is applied to pulse duration modulator 21. Modulator 21, responsive both to the filtered signal and to repetitive pulse signals emanating from clock 22, develops a train of pulses whose pulse width is dependent on the amplitude of the applied input signal. Modulators of this type are legion; any conventional type may be employed. The resulting train of pulses and the input signal are applied to modulator 17. As described above, the spectrum of the resulting modulated signal appearing at the output of modulator 17 contains the input signal spectrum and replicas thereof at harmonics of the pulse train fundamental frequency. The fundamental frequency in this case, of course, corresponds to the repetition frequency of the pulses emanating from clock 22. Harmonic selector 23, which may be a conventional bandpass filter, selectively transmits a predetermined replica. Since the pulse width of the modulating pulses is dependent on the amplitude of the applied signal, so also is the duty ratio of the train of pulses. Thus, attenuation is effected proportional to the level of the applied input signal. The signals emanating from selector 23 are modulated down to baseband by demodulator 24. Conveniently, the same train of pulses applied to modulator 17 may be used for this purpose. Modulator 17 and demodulator 24 may be coincidence (AND) circuits of any well-known type. Low pass filter 25 selectively transmits only the desired baseband signal. Thus, an output signal whose level is maintained at a constant value despite variations in the level of the applied signal appears at terminal 26.

In specific applications, a backward acting AGC circuit may be desired. The AGC circuit of FIG. 3 may be easily modified to be backward acting. All that is required is that switch 27 be positioned to connect the input of detector 18 to the output terminal 26 instead of to input 16. The operation of this backward acting AGC circuit is similar to the operation described above. However, in this case the level of the output signal is determinative of the duty ratio of the modulated pulse train. Thus, a signal applied to input terminal 16 is attenuated in proportion to the level of the output signal.

It is to be understood that the embodiments shown and described are illustrative of the principles of the invention only, and that further modifications of this invention may be employed by those skilled in the art without departing from the scope and spirit of the invention. For example, the principles of this invention may find use in conjunction with sampled data systems, pulsed microwave apparatus and diverse other communication systems requiring selective attenuation.

What is claimed is:

1. Apparatus for controlling the amplitude of an applied signal comprising, in combination: a source of input signals, a source of a train of pulses of alterable duty ratio, means responsive to said train of pulses and said input signals applied from said source for developing a plurality of secondary signals having frequency components identical to those of said applied signals and dependent in amplitude on said duty ratio, means supplied with said secondary signals for selecting as an output signal a preselected one of said plurality of secondary signals exhibiting a predetermined amplitude characteristic, and means operating in conjunction with said pulse train source for selectivity altering the duty ratio of said train of pulses to effect a desired amplitude variation in said selected output signal.

2. Apparatus for controlling the amplitude of applied signals comprising, in combination: a source of signals, a source of a train of pulses of continuously alterable duty ratio, means responsive to said train of pulses and signals applied from said source for developing a modulated secondary signal having a plurality of spectral bands, said bands including components identical to those of said applied signals and dependent in amplitude on said duty ratio, means supplied with said secondary signal for selecting one of said plurality of spectral bands which exhibits a predetermined amplitude characteristic, and means operating in cooperation with said pulse train source for selectively altering the duty ratio of said train of pulses to effect a desired amplitude variation.

3. Apparatus for altering the amplitude of an applied signal comprising: a source of a train of pulses of continuously variable duty ratio, means for product modulating a signal applied to said apparatus and said train of pulses to develop a modulated signal, the spectrum of which includes replicas of the spectrum of said applied signal, the amplitude of said spectral replicas being dependent on said duty ratio, means responsive to said modulated signal for transmitting a predetermined spectral replica of said applied signal, means cooperating with said pulse train source for altering the duty ratio of said pulse train in accordance with a predetermined attenuation schedule, and means connected to said transmitting means for translating said transmitted attenuated replica to a preselected band of frequencies.

4. Apparatus for altering the amplitude of an appled signal comprising: a source of a train of pulses of fixed fundamental frequency and variable pulse width, means for product modulating said applied signal and said train of pulses to develop a modulated signal whose spectrum includes replicas of the spectrum of said applied signal located at harmonics of said fundamental frequency, the amplitude of said spectral replicas being dependent on the width of said pulses, harmonic selector means supplied with signals from said modulating means exhibiting a bandpass characteristic in the vicinity of a predetermined harmonic of said fundamental frequency for transmitting a predetermined spectral replica of said applied signal, said pulse train source including control means for altering the pulse width of said pulses in accordance with a predetermined attenuation schedule, and second modulation means supplied with signals from said harmonic selector for translating said transmitted attenuated replica to a preselected band of frequencies.

5. A variable attenuator comprising: a source of information bearing signals, a source of a train of pulses of fixed fundamental frequency and variable pulse width, modulation means responsive to said information bearing signals and said train of pulses for developing a product signal whose spectrum includes the spectrum of said information bearing signals and replicas thereof in the form of sidebands symmetrically disposed about the harmonics of said pulse train fundamental frequency, means supplied with signals from said modulation means for selecting one of said sideband replicas associated with a predetermined harmonic of said fundamental frequency, said selected replica exhibiting an amplitude characteristic sensitive to variations in the width of said pulses, and means associated with said pulse train source and responsive to an applied control signal for varying the pulse width of said pulses in accordance with a prescribed format.

6. A variable attenuator comprising: a source of information bearing signals, a source of a train of pulses of continuously variable duty ratio, modulation means responsive to said information bearing signals and said train of pulses for developing a secondary signal whose spectrum includes replicas of the spectrum of said information bearing signals disposed about the harmonics of said pulse train fundamental frequency, means supplied with said secondary signal for selecting a predetermined one of said replicas, said selected replica exhibiting an amplitude characteristic sensitive to variations in said duty ratio, and means associated with said pulse train source and responsive to an applied control signal for altering said duty ratio.

7. Apparatus for maintaining the output signal level of communication apparatus substantially constant despite variations in the level of an applied input signal comprising: means responsive to said input signal for developing a control signal of a magnitude proportional to the level of said applied signal, means supplied with said control signal for developing a train of pulses of constant fundamental frequency and pulse width proportional to the magnitude of said control signal, first modulation means responsive to said applied signal and said train of pulses for developing a product signal whose spectrum includes the spectrum of said applied signal and replicas thereof in the form of sidebands symmetrically disposed about the harmonics of said pulse train fundamental frequency, means associated with said first modulation means for selecting one of said sideband replicas disposed about a predetermined harmonic of said fundamental frequency, said selected replica exhibiting an amplitude characteristic sensitive to variations in the width of said pulses, and second modulation means supplied with said selected replica and responsive to said train of pulses for translating the frequency components of said selected replica to a predetermined band of frequencies.

8. Automatic gain control apparatus comprising: means for developing a control signal of a magnitude proportional to the level of an applied signal, means supplied with said control signal for developing a train of pulses having a duty ratio proportional to the level of said control signal, first modulation means responsive to said applied signal and said train of pulses for developing a product signal the spectrum of which includes the spectrum of said applied signal and replicas thereof exhibiting an amplitude characteristic sensitive to variations in the width of said pulses, means connected to said first modulation means for selectively transmitting one of said replicas, and second modulator means connected to said transmitting means and responsive to said train of pulses for translating the frequency components of said transmitted replica.

9. Apparatus for maintaining a substantially constant output signal level despite variations in the level of an applied input signal comprising: means for developing a control signal of a magnitude proportional to the level of said output signal, means associated with said control signal developing means for developing a train of pulses of constant fundamental frequency and pulse width proportional to the magnitude of said control signal, first modulation means responsive to said applied signal and said train of pulses for developing a product signal whose spectrum includes the spectrum of said applied signal and replicas thereof in the form of sidebands symmetrically disposed about the harmonics of said pulse train fundamental frequency, means supplied with said product signal for selecting one of said sideband replicas disposed about a predetermined harmonic of said fundamental frequency, said selected replica exhibiting an amplitude characteristic sensitive to variations in the width of said pulses, and second modulation means responsive to said train of pulses and said selected replica for translating the frequency components of said selected replica to a predetermined band of frequencies.

References Cited

UNITED STATES PATENTS 2,958,049 10/1960 Fraser et al. --------- 331—55

ROY LAKE, *Primary Examiner.*

LAWRENCE J. DAHL, *Assistant Examiner.*

U.S. Cl. X.R.

329—106